United States Patent Office 3,526,497
Patented Sept. 1, 1970

3,526,497
METHOD OF REGULATING PLANT GROWTH WITH TETRACYANOQUINODIMETHANES AND FORMULATIONS OF SAID COMPOUNDS
Jean B. Obreiter, Glen Ridge, N.J., assignor to E. I. du Pont de Nemours and Company, Wilmington, Del., a corporation of Delaware
No Drawing. Filed July 30, 1968, Ser. No. 748,636
Int. Cl. A01n 5/00, 9/20
U.S. Cl. 71—105          5 Claims

ABSTRACT OF THE DISCLOSURE

This disclosure teaches methods for preparing, formulating and applying tetracyanoquinodimethanes to plants to regulate plant growth.

BACKGROUND OF THE INVENTION

This invention relates to the discovery that certain tetracyanoquinodimethanes can be employed to regulate the growth rate of plants.

Compounds of the group now found to exhibit plant growth regulant activity are disclosed in U.S. Pats. 3,115,-506 and 3,162,641 and in copending applications Ser. Nos. 514,385, filed Dec. 16, 1965, and 664,315 filed Aug. 30, 1967.

SUMMARY OF THE INVENTION

In summary, this invention relates to the method of using tetracyanoquinodimethanes to regulate the growth rate of plants and to formulations containing tetracyanoquinodimethanes which are useful to regulate the growth rate of plants.

More particularly, the tetracyanoquinodimethanes found useful to regulate the growth of plants according to the method of this invention are represented by the formula:

(1) 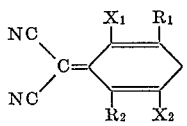

where
$X_1$ is hydrogen or fluorine;
$X_2$ is hydrogen or fluorine;
$R_1$ is hydrogen; halogen; cyano; alkyl of one through six carbons; alkoxy of one through twelve carbons; alkoxy of two through eleven carbons substituted with carboxy, alkoxy of one through six carbons or alkoxycarbonyl of two through seven carbons, with the limitation that the total carbon content of the substituted alkoxy is less than 13 carbon atoms; and
$R_2$ is hydrogen; halogen, cyano; alkyl of one through six carbons; alkoxy of one through twelve carbons; alkoxy of two through eleven carbons substituted with carboxy, alkoxy of one through six carbons or alkoxycarbonyl of two through seven carbons, with the limitation that the total carbon content of the substituted alkoxy is less than 13 carbon atoms.

Preferred compounds of this invention include those compounds of Formula 1 where $X_1$ and $X_2$ are hydrogen, $R_1$ is alkoxy of one through six carbons and $R_2$ is alkoxy of one through six carbons.

The most preferred compounds of this invention are those compounds of Formula 1 where $X_1$ and $X_2$ are hydrogen, $R_1$ is alkoxy of one through three carbons and $R_2$ is alkoxy of one through three carbons.

More particularly, this invention relates to a method for stimulating the growth of plants. The compounds of Formula 1 are applied to a plant or to the locus of a plant to stimulate the growth of said plant.

Preferably, the compounds of Formula 1 are applied to a legume or to the locus of a legume to stimulate the growth of said legume.

Another aspect of this invention relates to formulations of one or more compounds of Formula 1 with agricultural adjuvants and modifiers suitable for use according to the method of this invention.

DESCRIPTION OF THE INVENTION

This invention is based on the discovery that the compounds of Formula 1 are useful for modifying the growth of plants. In this regard, it has been noted that the compounds of Formula 1 when employed according to the method of this invention are useful to stimulate plant growth. This growth stimulant effect has been noted on many plants including such plants as alfalfa, peas, tomatoes, clover, soybeans, and snap beans. The mechanism by which the compounds of this invention act to stimulate plant growth is not completely understood. It is believed that at least part of the growth stimulation observed in legumes is due to stimulation of symbiotic nitrogen fixation in the roots by Rhizobium spp. bacteria. This is not, however, the only mechanism of action, for the compounds of this invention are also effective in stimulating plant growth when applied to plants such as tomatoes, which do not host nitrogen fixing bacteria. Often, the effect is seen as a stimulation of vegetative and/or reproductive growth in the plant treated.

From the foregoing, it will be understood that the compounds of Formula 1 can be used to stimulate plant growth.

It is also to be understood that the compounds of Formula 1 react readily with protonic solvents, the result being abstraction of protons from the solvent and formation of radicals which give stable ion-radicals in basic media. The formation of such radicals is represented by Equation 2 below.

(2) 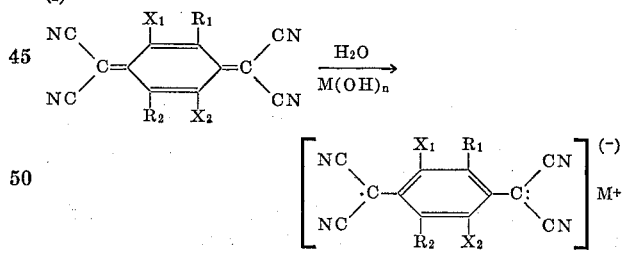

where
$X_1$, $X_2$, $R_1$ and $R_2$ are as defined for the compounds represented by Formula 1;
M is an alkali metal cation or alkaline earth metal cation; and
$n$ is 1 or 2.

It is further understood that solutions containing these ion-radicals possess plant growth regulating utility similar to that of the parent compounds as represented by Formula 1.

Preparation

Methods for preparing tetracyanoquinodimethanes are known to the art. Detailed descriptions of such procedures are discussed in U.S. Pat. Nos. 3,115,506 and 3,162,641 and in copending applications Ser. Nos. 514,385 filed Dec. 16, 1965, and 664,315, filed Aug. 30, 1967.

In general, the compounds of Formula 1 can be prepared by reacting an appropriately substituted benzene with hydrogen chloride and formaldehyde to give a 1,4-bis(chloromethyl)benzene corresponding to the starting benzene derivative employed. Preferably, paraformaldehyde is used as the source of formaldehyde for this reaction.

The 1,4-bis(chloromethyl)benzene is treated with an alkali metal cyanide, preferably sodium cyanide, to give a 1,4-bis(cyanomethyl)benzene.

The 1,4-bis(cyanomethyl)benzene is first treated with dimethylcarbonate and sodium methoxide and the product of this reaction is then treated with a cyanogen halide, preferably cyanogen chloride, to give a dimethyl $\alpha,\alpha,\alpha',\alpha'$-tetracyano-1,4-phenylenediacetate.

The dimethyl $\alpha,\alpha,\alpha',\alpha'$-tetracyano-1,4-phenylenediacetate is then treated with aqueous base such as aqueous potassium hydroxide, is acidified with hydrochloric acid and is then treated with bromine to give the desired 7,7,8,8-tetracyanoquinodimethane.

The above described general procedure is represented by the following equations.

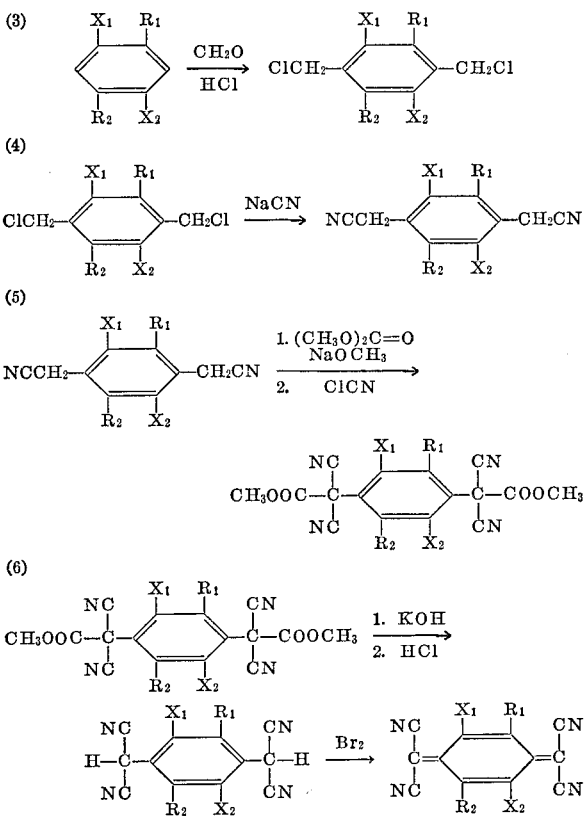

In Equations 2–6 $R_1$, $R_2$, $X_1$ and $X_2$ are defined for the compounds represented by Formula 1.

The following examples are presented to better illustrate this invention.

In the following examples parts and percentages are by weight unless otherwise specified.

EXAMPLE 1

1,4-bis(chloromethyl)-2,5-dimethoxybenzene

A slow stream of dry hydrogen chloride is passed into a mechanically stirred mixture of 82 parts of p-dimethoxybenzene, 45 parts of paraformaldehyde, 100 parts of glacial acetic acid and 200 parts of concentrated hydrochloric acid at 50–55° C. for a period of 2 hours. It is necessary to cool the reaction mixture externally until the exothermic reaction ceases. Crystals of the dichloride start to separate within about 15 minutes after the start of the reaction, and at the end of 2 hours, a crystalline, thick reaction mass is obtained. The reaction product is collected by suction filtration and washed with about 2000 parts of cold water. The moist filter cake is dissolved in about 2000 parts of methylene chloride and the organic layer is treated with decolorizing charcoal and anhydrous magnesium sulfate and filtered.

The resulting colorless filtrate is concentrated to a thick paste of colorless crystals; the mixture is cooled to 0° C., filtered, the solid washed with cold methylene chloride and after air-drying, dried under reduced pressure over phosphorus pentoxide-potassium hydroxide to give pure 1,4-bis(chloromethyl)-2,5-dimethoxybenzene.

EXAMPLE 2

1,4-bis(cyanomethyl)-2,5-dimethoxybenzene

To a mechanically stirred suspension of 35 parts of sodium cyanide in 200 parts of dimethyl sulfoxide is added in small portions 71 parts of 1,4-bis(chloromethyl)-2,5-dimethoxybenzene. The temperature is maintained at 50° C. by controlling the rate of addition of the dichloride and by means of external cooling. The reaction mixture is maintained at 50° C. for an additional hour after the addition of the dichloride is completed and then the temperature is increased to 85° C. for 5 minutes. After cooling to about 40° C., the reaction mixture is diluted to about three times its volume with water and the precipitated dinitrile is collected and washed with water until essentially neutral. The moist filter cake is dissolved in about 2000 parts of methylene chloride; the organic layer is dried and concentrated until a thick paste of crystals is obtained. After cooling to room temperature, the dinitrile is collected and washed in turn with methylene chloride and ether. Pure 1,4-bis(cyanomethyl)-2,5-dimethoxybenzene is obtained after drying under reduced pressure over phosphorus pentoxide at 50° C.

EXAMPLE 3

Dimethyl-$\alpha,\alpha,\alpha',\alpha'$-tetracyano-2,5-dimethoxy-1,4-phenylenediacetate A mechanically stirred mixture of 43 parts 1,4-bis(cyanomethyl)-2,5-dimethoxybenzene, 250 parts of dimethyl carbonate and 27 parts of sodium methoxide is warmed to 70° C. whereupon a spontaneous reaction occurs; the temperature increases to 80° C., the sodium methoxide partially dissolves and after a few minutes a solid begins to precipitate. About 50 parts of benzene is added and the reaction mixture is refluxed for 3 hours. The benzene-methanol binary is removed by distillation during the course of 1 hour, additional benzene being added as required. The suspension of the disodium derivative of dimethyl $\alpha,\alpha'$-dicyano-2,5-dimethoxy-1,4-phenylenediacetate is cooled to 5° C. and 35 parts of cyanogen chloride is distilled into the reaction mixture at 5–10° C. After a slight exothermic reaction, the temperature is increased to 65° C. during the course of about 2 hours. After stirring overnight at room temperature, the temperature of the reaction mixture is increased to 50° C., and the reaction mixture is evaporated to dryness under reduced pressure in a bath at 50–60° C. The solid residue of dimethyl $\alpha,\alpha,\alpha',\alpha'$ - tetracyano-2,5-dimethoxy - 1,4-phenylenediacetate and solid chloride is stirred in a blender with cold water. The crude ester is collected, washed with cold water and the moist filter cake is dissolved in methylene chloride. The organic layer is treated with decolorizing carbon and anhydrous magnesium sulfate, filtered and the filtrate is concentrated until crystals begin to separate.

Addition of ether precipitates the tetracyanodiacetate. After cooling to —5°C., the colorless crystals (dimethyl-$\alpha,\alpha,\alpha',\alpha'$-tetracyano - 2,5 - dimethoxy-1,4-phenylenediacetate) are collected, washed with cold ether and dried.

EXAMPLE 4

2,5-dimethoxy-7,7,8,8-tetracyanoquinodimethane

To 3.8 parts of dimethyl $\alpha,\alpha,\alpha',\alpha'$-tetracyano-2,5-dimethoxy-1,4-phenylenediacetate is added 40 parts of a 10% aqueous potassium hydroxide solution and the mixture is stirred until a homogeneous solution is obtained. The solution is acidified by the addition of 6 N hydrochloric acid, and the resulting suspension of 1,4-bis(dicyanomethyl)-2,5-dimethoxybenzene is treated with bromine water until decolorization no longer occurs.

The resulting red product is collected, washed with cold water and dissolved in about 600 ml. of methylene chloride. The organic layer is dried, treated with decolorizing charcoal, filtered and concentrated to a small volume, whereupon deep red crystals of 2,5-dimethoxy-7,7,8,8-tetracyanoquinodimethane separate. The crystals of 2,5 - dimethoxy-7,7,8,8-tetracyanoquinodimethane are collected washed with methylene chloride and dried.

As will be understood from the foregoing, the procedure set forth in Examples 1–4 can, in general, be used to prepare the compounds of Formula 1. For example, the 7,7,8,8-tetracyanoquinodimethane products listed below can be prepared according to the procedure of Examples 1–4 by replacing the 1,4-dimethoxybenzene of said examples with the appropriate benzene derivative as starting material.

| Starting benzene | 7,7,8,8-tetracyanoquinodimethane product |
|---|---|
| 1,4-diethoxybenzene | 2,5-diethoxy-7,7,8,8-tetracyanoquinodimethane. |
| 1,4-diisopropoxybenzene | 2,5-diisopropoxy-7,7,8,8-tetracyanoquinodimethane. |
| Benzene | 7,7,8,8-tetracyanoquinodimethane. |
| 1,4-diisobutoxybenzene | 2,5-diisobutoxy-7,7,8,8-tetracyanoquinodimethane. |
| 1,4-dibutoxybenzene | 2,5-dibutoxy-7,7,8,8-tetracyanoquinodimethane. |
| 4-ethoxyanisole | 2-ethoxy-5-methoxy-7,7,8,8-tetracyanoquinodimethane. |
| 1,4-diisopentoxybenzene | 2,5-diisopentoxy-7,7,8,8-tetracyanoquinodimethane. |
| 4-isobutoxyanisole | 2-isobutoxy-5-methoxy-7,7,8,8-tetracyanoquinodimethane. |
| 4-isopropoxyanisole | 2-isopropoxy-5-methoxy-7,7,8,8-tetracyanoquinodimethane. |
| 4-isopentoxyanisole | 2-isopentoxy-5-methoxy-7,7,8,8-tetracyanoquinodimethane. |
| 4-decoxyanisole | 2-decoxy-5-methoxy-7,7,8,8-tetracyanoquinodimethane. |
| 4-(2-methoxyethoxy)-anisole | 2-(2-methoxyethoxy)-5-methoxy-7,7,8,8-tetracyanoquinodimethane. |
| 4-(2-ethoxyethoxy)-anisole | 2-(2-ethoxyethoxy)-5-methoxy-7,7,8,8-tetracyanoquinodimethane. |
| 4-(carboxymethoxy)-anisole | 2-(carboxymethoxy)-5-methoxy-7,7,8,8-tetracyanoquinodimethane. |
| 4-(2-decoxyethoxy)-anisole | 2-(2-decoxyethoxy)-5-methoxy-7,7,8,8-tetracyanoquinodimethane. |
| 1,2,4,5-tetrafluorobenzene | 2,3,5,6-tetrafluoro-7,7,8,8-tetracyanoquinodimethane. |
| 1,4-difluorobenzene | 2,5-difluoro-7,7,8,8-tetracyanoquinodimethane. |
| 1,4-dichlorobenzene | 2,5-dichloro-7,7,8,8-tetracyanoquinodimethane. |
| 4-chloroanisole | 2-chloro-5-methoxy-7,7,8,8-tetracyanoquinodimethane. |
| 4-bromophenetole | 2-bromo-5-ethoxy-7,7,8,8-tetracyanoquinodimethane. |
| 1,4-diiodobenzene | 2,5-diiodo-7,7,8,8-tetracyanoquinodimethane. |
| 4-(ethoxycarbonylmethoxy)-anisole | 2-(ethoxycarbonylmethoxy)-5-methoxy-7,7,8,8-tetracyanoquinodimethane. |
| 1,4-dicyanobenzene | 2,5,7,7,8,8-hexacyanoquinodimethane. |
| p-Xylene | 2,5-dimethyl-7,7,8,8-tetracyanoquinodimethane. |
| 4-hexylanisole | 2-hexyl-5-methoxy-7,7,8,8-tetracyanoquinodimethane. |
| 4-fluorophenetole | 2-ethoxy-5-fluoro-7,7,8,8-tetracyanoquinodimthane. |
| 1,4-didecoxybenzene | 2,5-didecoxy-7,7,8,8-tetracyanoquinodimethane. |
| 1,4-dicyanobenezene | 2,5-dicyano-7,7,8,8-tetracyanoquinodimethane. |
| 4-bromotoluene | 2-bromo-5-methyl-7,7,8,8-tetracyano-quinodimethane. |
| 4-ethylphenetole | 2-ethoxy-5-ethyl-7,7,8,8-tetracyanoquinodimethane. |
| 4-iodoethylbenzene | 2-ethyl-5-iodo-7,7,8,8-tetracyanoquinodimethane. |
| 4-tert.-butylphenetole | 2-tert.-butyl-5-ethoxy-7,7,8,8-tetracyanoquinodimethane. |

Formulation and application

As stated earlier, this invention is based on the discovery that the compounds of Formula 1 can be applied to plants to modify the growth of said plant.

To achieve this modification, the compounds of this invention can be applied as foliar-soil treatments, foliar treatments or as soil treatments. When the soil treatment method of application is used, it is necessary to mix the active with the soil, place the active in the root zone or otherwise provide for the plant roots to contact the active.

It will be recognized that the rate of application is dependent upon the method of application, the species to be treated, the results desired, the stage of plant growth at the time of application and other environmental factors. In general, rates from 0.25 to about 10 kilograms per hectare can be used to stimulate plant growth according to the method of this invention. However, the preferred rates for most uses is between 0.5 and 5 kilograms per hectare.

Foliar applications may benefit from the addition of 0.1 to 1% of a non-phytotoxic wetting agent to the spray.

Plant growth regulant compositions of the present invention can be prepared by admixing at least one of the compounds of Formula 1 with pest control adjuvants or modifiers to provide compositions in the form of dusts, granules, pellets, water-dispersible powders, high-strength concentrates, aqueous solutions, dispersions or emulsions and solutions or dispersions in organic liquids.

Thus, the compounds of this invention can be used with a carrier or diluent agent such as a finely divided solid, an organic liquid, water, a wetting agent, a dispersing agent, an emulsifying agent, or any suitable combination of these.

Compositions of the invention, especially liquids and wettable powders, contain as a conditioning agent one or more surface-active agents, sometimes called surfactants, in amounts sufficient to render a given composition containing the active compounds readily dispersible in water or in oil.

The surface active agent used in this invention can be a wetting, dispersing or an emulsifying agent which will assist dispersion of the compound. The surface-active agent or surfactant can include such anionic, cationic and nonionic agents as have heretofore been generally employed in plant control compositions of similar type. Suitable surface-active agents are set forth, for example, in "Detergents and Emulsifiers" 1967 Annual by John W. McCutcheon, Inc.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions may have a greater biological effectiveness than can be expected from a consideration of the activity of the components used separately. When used at higher rates, it is preferred that the surfactant be present in the range of one-fifth to five parts surfactant for each one part of active agent.

Wettable powders

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the active compounds are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed by J. W. McCutcheon in "Detergents and Emulsifiers" 1967 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, lignin sulfonates, polymeric alkylnaphthalene sulfonates, sodium naphthalenesulfonate, polymethylene bis-naphthalenesulfonate, and sodium - N - methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 25 to 90 weight percent active material, from 0.5 to 2.0 weight percent wetting agent, from 0.25 to 5.0 weight percent dispersant, and from 9.25 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

High-strength compositions and aqueous suspension concentrates

High-strength compositions generally consist of 90 to 99.5% active ingredient and 0.5 to 10% of a liquid or solid surfactant such as those described by McCutcheon in "Detergents and Emulsifiers" 1967 Annual. Such high-strength compositions can often be used in a manner similar to the wettable powders but they are also suitable for further formulation.

The aqueous suspension concentrates are prepared by mixing together and sandgrinding an aqueous slurry of water-insoluble active ingredient in the presence of dispersing agents until a concentrated aqueous slurry is obtained in which the particle of active ingredient are substantially all below 5 microns in size. This concentrated aqueous suspension is characterized by its extremely small particle size so that upon diluting and spraying, a very uniform coverage is obtained.

These aqueous suspension concentrates will contain from 15 to 40% of active ingredient, from 45 to 70% water with the remainder made up of surfactants, corrosion inhibitors, and suspending agents.

Suspensions in organic liquids can be prepared in a similar manner such as by replacing the water with mineral oil.

Dusts

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender. Their performance is sometimes aided by the inclusion of a wetting agent, and convenience in manufacture frequently demands the inclusion of an inert, absorptive grinding aid.

The wettable powders described above can also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material, 5 to 50 weight percent absorptive filler, 0 to 1.0 weight percent wetting agent, and about 30 to 90 weight percent dense, free-flowing extender, as these terms are used herein. Such dust formulations can contain, in addition, minor amounts of dispersants, corrosion inhibitors, and anti-foam agents, derived from the wettable powders used to make the dusts.

Emulsifiable oils

Emulsifiible oils are usually solutions of active material in non-water miscible solvents together with a surfactant.

For the compounds of this invention, emulsifiable oils can be made by mixing the active ingredient with a solvent and surfactant. Suitable solvents for the compounds of this invention are chlorinated solvents, non-water miscible ethers, esters, or ketones alone or in admixture with aromatic hydrocarbons. Suitable surfactants are those anionic or non-ionic agents known to the art as emulsifying agents. Such compounds can be found listed in "Detergents and Emulsifiers" 1967 Annual by John W. McCutcheon, Inc.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty acid esters, polyethylene glycol esters with fatty or rosin acids, fatty alkylol amide condensates, calcium and amine salts of fatty alcohol sulfates, oil soluble petroleum sulfonates or, preferably, mixtures of these emulsifying agents. Such emulsifying agents will comprise from about 1 to 10 weight percent of the total composition. As described above, however, up to 5 parts of emulsifying agent for each part of active material can be used.

Thus, emulsifiable oil compositions of the present invention will consist of from about 10 to 50 weight percent active material, about 40 to 82 weight percent solvent, and about 1 to 10 weight percent emulsifier, as these terms are defined and used above.

In some instances the oil solution may be intended merely for extension with other oils, and in this instance, the emulsifying agents may be omitted and may be replaced by additional solvent.

Granules and pellets

Granules and pellets are physically stable, particulate compositions containing a compound of this invention which adheres to or is distributed through a basic matrix of a coherent, inert carrier with microscopic dimensions. In order to aid leaching of the active ingredient from the granule or pellet, a surfactant can be present.

For the compounds of this invention, the inert carrier is preferably of mineral origin, and the surfactant compounds are listed by J. W. McCutcheon in "Detergents and Emulsifiers" 1967 Annual.

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight percent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules or pellets can also be made with 25 to 30 weight percent active component, but more frequently a concentration of about 10 weight percent is desired for optimum distribution. The granular compositions of this invention are most useful in a size range of 15–30 mesh.

The most suitable wetting agents for the granular compositions of this invention depend upon the type of granule used. When preformed granules are sprayed with active material in liquid form, the most suitable wetting agents are non-ionic, liquid wetters miscible with the solvent. These are compounds more generally known to the art as emulsifiers, and comprise alkylaryl polyether aclohols, alkyl polyether alcohols, polyoxyethylene sorbitan fatty acid esters, polyethylene glycol esters with fatty or rosen acids, fatty alkylol amide condensates, oil soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid non-ionic wetters can still be used, but it is usually preferable to incorporate at the maxing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 5 to 30 weight percent active material, about 0 to 5 weight percent wetting agent, and about 65 to 95 weight percent inert mineral carrier, as these terms are used herein.

Aqueous solutions

Certain compounds of this invention are soluble in mildly alkaline solution and can be formulated and applied in aqueous solution at concentrations up to approximately 20%.

EXAMPLE 5

A dust having wettable powder composition of the following fromula is prepared.

| | Percent |
|---|---|
| 7,7,8,8-tetracyanoquinodimethane | 50.0 |
| Montmorillonite clay | 45.0 |
| Finely divided synthetic silica | 2.0 |
| Sodium lignin sulfonate | 1.0 |
| Sodium alkyl naphthalene sulfonate | 2.0 |

The above ingredients are blended, ground to a particle size essentially below 50 microns and reblended.

It will be understood that all of the compounds of this invention can be formulated in like manner.

Four kilograms of the above formulation are suspended in 400 liters of water. This suspension is sprayed on one hectare of alfalfa in the spring when it is about 10–15 cm. tall. The treatment stimulates symbiotic nitrogen fixation in the alfalfa. This stimulation results in fixed nitrogen being available to the alfalfa with an increase in growth and yield of forage over the season as a result.

EXAMPLE 6

A dust of the following formula is prepared.

| | Percent |
|---|---|
| Formulation of Example 5 | 20.0 |
| Talc | 80.0 |

The above ingredients are blended to produce a biologically active dust.

Thirty kilograms of this dust are applied to one hectare of a mixed clover (Trifolium spp.)-orchard grass (Dactylis spp.) stand in the spring when the vegetation is about 15 cm. tall. The application is made in the early morning when the foliage is wet with dew. The treatment stimulates the symbiotic fixation of nitrogen by the clover. This results in a large supply of available nitrogen for both the legumes and the grass during the season and an increased forage yield is obtained.

EXAMPLE 7

A high strength composition of the following formula is prepared.

| | Percent |
|---|---|
| 2,5-dimethoxy-7,7,8,8-tetracyanoquinodimethane | 99.0 |
| Trimethylnonyl polyethylene glycol ether | 1.0 |

The above ingredients are blended and ground to pass a 0.25 mm. screen. This high strength composition is suitable for further formulation or can be applied directly as a water slurry with efficient agitation.

This material may be applied in a manner similar to that described in the previous example to a mixed clover-orchard grass stand using vigorous agitation.

Similar results are obtained.

EXAMPLE 8

A wettable powder of the following formula is prepared.

| | Percent |
|---|---|
| 2-ethoxy - 5 - methoxy-7,7,8,8-tetracyanoquinodimethane | 80.0 |
| Diatomaceous earth | 18.0 |
| Methylated cellulose | 0.5 |
| Dioctylsodium sulfosuccinate | 1.5 |

The above ingredients are blended and ground to a particle size essentially less than 50 microns and reblended.

One kilogram of this formulation is applied to one hectare of soybeans as a foliar spray at the time the third true leaf is forming. A second application is made just as the first flower begins to form. The treatments result in increased growth and yield from the treated soybeans.

The following compounds of Formula 1 can also be formulated to give an eighty percent wettable powder as in Example 8.

2,5-diisopropoxy-7,7,8,8-tetracyanoquinodimethane
2-isopentoxy-5-methoxy-7,7,8,8-tetracyanoquinodimethane

EXAMPLE 9

The following aqueous solution is prepared.

| | Percent |
|---|---|
| 2 - carbomethoxy - 5 - methoxy-7,7,8,8-tetracyanoquinodimethane | 5.0 |
| Sodium lauryl sulfate | 10.0 |
| Sodium bicarbonate | 2.5 |
| Water | 82.5 |

The above ingredients are stirred together until solution results. Eight kilograms of this composition are diluted with 100 liters of water and applied to one hectare of peas two weeks before flowering begins. A second application is made just as the plants begin to flower. The treatments result in an increase in pea yield from the treated area compared to similar untreated areas in the same field.

EXAMPLE 10

The following suspension is prepared.

| | Percent |
|---|---|
| 2,5 - diisopentyloxy - 7,7,8,8 - tetracyanoquinodimethane | 30.0 |
| Calcium lignin sulfonate and wood sugars | 15.0 |
| Hydrated attapulgite | 2.0 |
| Sodium alkylbenzene sulfonate | 1.0 |
| Water | 52.0 |

The above ingredients, except the water, are ground to pass a 0.42 mm. screen. The water is then added and the resulting slurry is sand-ground to a particle size essentially less than 5 microns.

Four kilograms of this material are applied to one hectare of soybeans as the second trifoliate leaf is expanding. The application is made in 200 liters of water containing 0.5% of a non-phytotoxic wetting agent. The treatment results in increased growth of the soybeans and an increased yield at harvest.

EXAMPLE 11

An emulsifiable concentrate of the following formula is prepared.

|  | Percent |
|---|---|
| 2-methoxy - 5 - (2 - ethoxyethyl)-7,7,8,8-tetracyanoquinodimethane | 12.0 |
| Isophorone | 58.0 |
| Methylene chloride | 20.0 |
| Blend of polyoxyethylene condensates and alkylaryl sulfonates | 10.0 |

The above ingredients are blended with stirring to form an emulsifiable concentrate.

The following compounds can be formulated in like manner.

2,5-dibutoxy-7,7,8,8-tetracyanoquinodimethane
2-methoxy-5-(2-methoxyethyl)-7,7,8,8-tetracyanoquinodimethane
2-isopropoxy-5-methoxy-7,7,8,8-tetracyanoquinodimethane
2,5-diisobutoxy-5-methoxy-7,7,8,8-tetracyanoquinodimethane
2-isobutoxy-5-methoxy-7,7,8,8-tetracyanoquinodimethane Ten kilograms of the formulation of Example 11 are emulsified in 200 liters of water and applied to one hectare of tomatoes which have the first hand of flowers forming. This treatment stimulates the vegetative growth of the tomato plants and results in a higher yield of fruit.

EXAMPLE 12

A granular composition of the following formula is prepared.

|  | Percent |
|---|---|
| 2 - carbomethoxy - 5 - methoxy-7,7,8,8-tetracyanoquinodimethane | 5.0 |
| Sodium bicarbonate | 2.0 |
| Attapulgite granules (15–30 mesh) | 95.0 |

The active compound is dissolved in aqueous bicarbonate solution with warming to form a 15% active solution. This solution is sprayed on the granules which are tumbled in a mixer. After drying, the granules are ready for application.

These granules are applied in the row prior to wetting tomatoes at the rate of twenty kilograms per 4000 meters of row. The tomato plants are then set in the treated row. This treatment stimulates the growth, and fruit set on the tomatoes.

EXAMPLE 13

A granular composition of the following formula is prepared.

|  | Percent |
|---|---|
| 2,5 - diethoxy-7,7,8,8-tetracyanoquinodimethane | 10.0 |
| Kaolinite | 38.0 |
| Sub-bentonite | 38.0 |
| Sodium lignin sulfonate | 3.0 |
| Anhydrous sodium sulfate | 10.0 |
| Alkylphenylpolyethyleneglycol ether | 1.0 |

The above ingredients are ground to pass a 0.21 mm. screen, are moistened with 18–22% water, are extruded through a ⅛ inch die, are cut to the desired length and are then dried. The resulting pellets can be applied directly or can be further subdivided into granules.

The following compounds of Formula 1 can be formulated in like manner.

2,5-dimethoxy-7,7,8,8-tetracyanoquinodimethane
2,5-diisopropoxy-7,7,8,8-tetracyanoquinodimethane
2,5-diisobutoxy-7,7,8,8-tetracyanoquinodimethane Granules prepared as described in Example 13 are placed in the row at the time soybeans are planted at the rate of ten kilograms per 8,000 meters of row. The treatment stimulates symbiotic nitrogen fixation in the soybeans. The increase in available nitrogenous fertilizer results in increased soybean growth and a larger yield.

EXAMPLE 14

An emulsifiable liquid of the following formula is prepared.

|  | Percent |
|---|---|
| 2,5-dimethoxy-7,7,8,8-tetracyanoquinodimethane | 25.0 |
| Lecithin | 5.0 |
| Blend of polyoxyethylene condensates | 5.0 |
| Mineral oil | 65.0 |

The active ingredient is ground to pass an 0.42 mm. screen, blended with the remainder of the formulation ingredients and sand-ground to a particle size essentially below 5.0 microns. This emulsifiable suspension can be applied similarly to emulsifiable solution.

One kilogram of this composition per hectare is sprayed on tomatoes which have the first flower cluster beginning to develop. Application is made in 200 liters of water. This treatment is repeated every ten days for a total of three applications. The treatments stimulate the growth of the tomatoes and result in an increase in the yield of fruit from the treated plants compared to similar untreated ones.

What is claimed is:
1. A method of stimulating plant growth which comprises applying an effective amount of a compound of the following formula to the locus of said plant

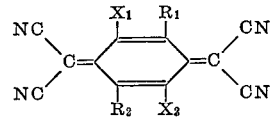

where
  $X_1$ is hydrogen or fluorine;
  $X_2$ is hydrogen or fluorine;
  $R_1$ is hydrogen; halogen; cyano; alkyl of one through six carbons; alkoxy of one through twelve carbons; alkoxy of two through eleven carbons substituted with carboxy, alkoxy of one through six carbons or alkoxycarbonyl of two through seven carbons, with the limitation that the total carbon content of the substituted alkoxy is less than 13 carbon atoms; and
  $R_2$ is hydrogen; halogen; cyano; alkyl of one through six carbons; alkoxy of one through twelve carbons; alkoxy of two through eleven carbons substituted with carboxy, alkoxy of one through six carbons or alkoxycarbonyl of two through seven carbons, with the limitation that the total carbon content of the substituted alkoxy is less than 13 carbon atoms.

2. The method of claim 1 which comprises applying an effective amount of a compound of the following formula to the locus of said plant

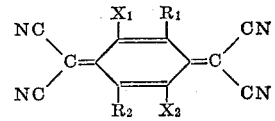

where
  $X_1$ and $X_2$ are hydrogen;
  $R_1$ is alkoxy of one through six carbons; and
  $R_2$ is alkoxy of one through six carbons.

3. The method of claim 1 which comprises applying an effective amount of a compound of the following formula to the locus of said plant

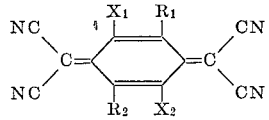

where
 $X_1$ and $X_2$ are hydrogen;
 $R_1$ is alkoxy of one through three carbons; and
 $R_2$ is alkoxy of one through three carbons.

4. The method of claim 1 in which the compound employed is 2,5 - dimethoxy - 7,7,8,8 - tetracyanoquinodimethane.

5. The method of claim 1 in which the compound employed is 2,5 - diethoxy - 7,7,8,8 - tetracyanoquinodimethane.

References Cited

UNITED STATES PATENTS

| | | | |
|---|---|---|---|
| 2,683,659 | 7/1954 | Schlesinger et al. | 71—105 |
| 3,115,506 | 12/1963 | Acker et al. | 260—396 |
| 3,149,150 | 9/1964 | Shulgin | 71—105 |
| 3,162,641 | 12/1964 | Acker et al. | 260—286 |
| 3,250,798 | 5/1966 | Shulgin | 71—105 |
| 3,277,193 | 10/1966 | Fullhart | 260—652.5 |
| 3,408,367 | 10/1968 | Andreades | 260—396 |

LEWIS GOTTS, Primary Examiner

G. HOLLRAH, Assistant Examiner

U.S. Cl. X.R.

71—77; 260—396, 464, 465, 613